United States Patent

[11] 3,584,785

| | | |
|---|---|---|
| [72] | Inventor | Dan S. Matulich<br>Rolling Hills Estates, Calif. |
| [21] | Appl. No | 809,510 |
| [22] | Filed | Mar. 24, 1969 |
| [45] | Patented | June 15, 1971 |
| [73] | Assignee | The Garrett Corporation<br>Los Angeles, Calif. |

[54] ELECTRONIC ANTI-ICE CONTROL
12 Claims, 3 Drawing Figs.

[52] U.S. Cl..................................... 236/13,
62/140, 165/17, 165/31, 236/80
[51] Int. Cl................................................ G05d 11/16
[50] Field of Search................................... 62/176,
140; 165/17, 36, 23, 31; 236/13, 80, 38

[56] References Cited
UNITED STATES PATENTS
2,261,852  11/1941  Mathis......................... 236/13 X 3,465,962  9/1969  Matulich et al  .......... 236/13

*Primary Examiner*—Meyer Perlin
*Attorneys*—John N. Hazelwood, Edward B. Johnson, Albert J. Miller and Orville R. Seidner ABSTRACT: An electronic control system, for an air conditioning unit, has temperature probes for sensing both the dry bulb temperature and the wet bulb temperature (dew point) of a fresh air stream and producing first and second signals representing the respective temperatures. The signals are compared and whenever the dew point is approximately equal to or above the dry bulb temperature, indicating an icing condition, a means is activated to warm up the air stream. The system also includes an override means, that prevents the temperature of the fresh air from falling below a preselected minimum temperature. Further included is an ice collection screen, as a backup, for detecting an icing condition to override the electronic system to add heat to the air stream.

INVENTOR.
DAN S. MATULICH

ATTORNEY

ELECTRONIC ANTI-ICE CONTROL

This invention relates to an air conditioning unit and, more particularly, to a unit having an improved system for preventing the formation of ice.

When ventilation air is supplied to an aircraft cabin, the moisture content should be controlled, since highly moisturized air forms condensation within the cabin. Moisture is removed by passing the air through a water separator of standard design. However, if the dry bulb temperature is below freezing and the air is saturated with water, the water would freeze within the water separator blocking the flow of air. Consequently, devices of various types have been used to prevent the formation of ice in the water separator. Prior art ice-prevention devices operate only after some ice has been detected within the ventilation ducts.

An object of this invention is to provide a control system which prevents the formation of ice in ventilation air before the appearance of ice crystals.

Another object of this invention is to provide a simple, dependable and accurate control system for preventing the formation of ice in a supply of air.

Another object of this invention is to provide a means in an ice prevention control system for inhibiting the warming of the air supply when the dry bulb temperature is above 32° F. at which condition ice cannot form.

These and other features, advantages, and objects will become apparent from a review of the following description of a preferred embodiment and claims when taken in conjunction with the drawing wherein:

Figure 1:
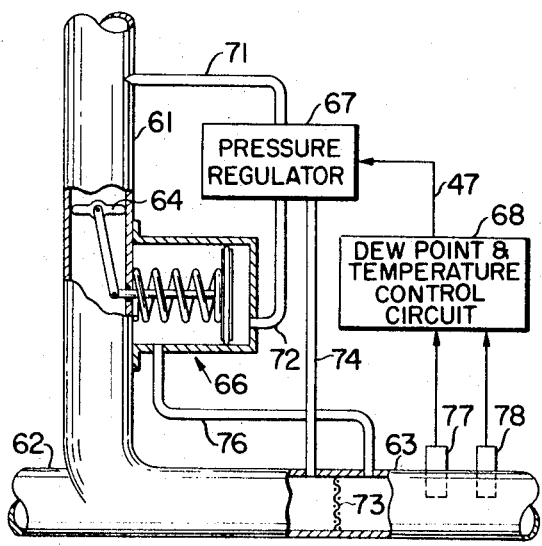
FIG. 1 is a schematic of the control system for an air conditioning unit.

Referring to the drawing, and to FIG. 1 in particular, wherein is shown a schematic of the novel control system for an air conditioning unit, warm air, preferably at a higher pressure than ambient, is fed through a duct 61, and cold air is fed through a duct 62. The two are mixed in a duct 63. The mixed fresh air is fed by duct 63 to an inhabitable place (not shown) such as a passenger cabin on an aircraft. Within duct 61 is disposed a butterfly valve 64 to modulate the flow of warm air. The valve 64 is controlled by a pneumatic piston and cylinder assembly 66 whose piston is suitably linked to the valve 64. The pressure of the fluid supplied to assembly 66 is controlled by a pressure regulator 67 that responds to a signal supplied by a novel dew point and temperature control circuit 68. The control circuit 68 will be described hereinafter. While the pressure regulator 67 could be of the type as taught in U.S. Pat. application No. 717,141 filed Mar. 29, 1968, now U.S. Pat. No. 3,465,962, and assigned to the same assignee as this application. Fluid pressure that is controlled by regulator 67 is supplied by tubing 71 and the regulated fluid pressure is supplied to the piston and cylinder assembly by tubing 72. As a safety precaution (in case of a failure in electronic dew point control) duct 63 has disposed therein a screen 73 for trapping any ice crystals that may be formed. Then to melt the ice crystals, valve 16 should open to warm the air in duct 63. The valve 16 opens in response to a differential pressure developed by the icing condition across the screen 73, since the head end of the piston communicates with the upstream side of the screen 73 through tubing 72, regulator 67, and tubing 74 (as described in the above-mentioned application), and since the opposing end of the piston communicates with the downstream side of the screen by tubing 76. The spring in assembly 66 provides piston motion that is proportional to the effective pressure applied on the head of the piston.

Since the presence of some ice could mean that there may be substantial ice present in duct 63, an air conditioning system, that responds before ice crystals are detected, is preferred over a system that responds after ice crystals are detected. Therefore, this invention includes two temperature probes 77 and 78 in duct 63 to sense, respectively, the dry bulb temperature and the wet bulb temperature and develop analogue electric signals that are respectively related to the temperatures. The signals are fed to the control circuits in the form of analogue voltages. Then, when the wet bulb temperature is close to or above the dry bulb temperature, circuit 68 feeds another analogue voltage to regulator 67 to cause the regulated pressure to rise and, in turn, open valve 64.

Figure 3:
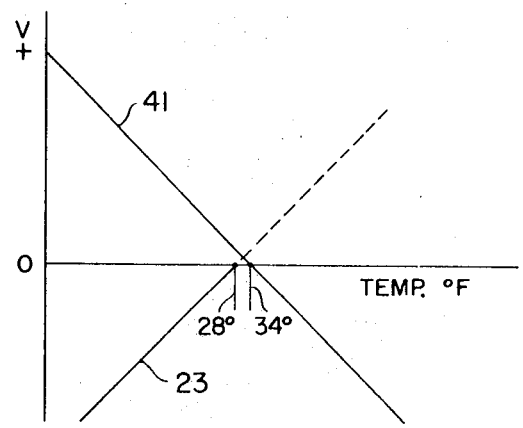
FIG. 3 is a graph of the output voltages of the dry and wet bulb amplifiers, respectively, with respect to temperature in degrees Fahrenheit (° F.).
Figure 2:
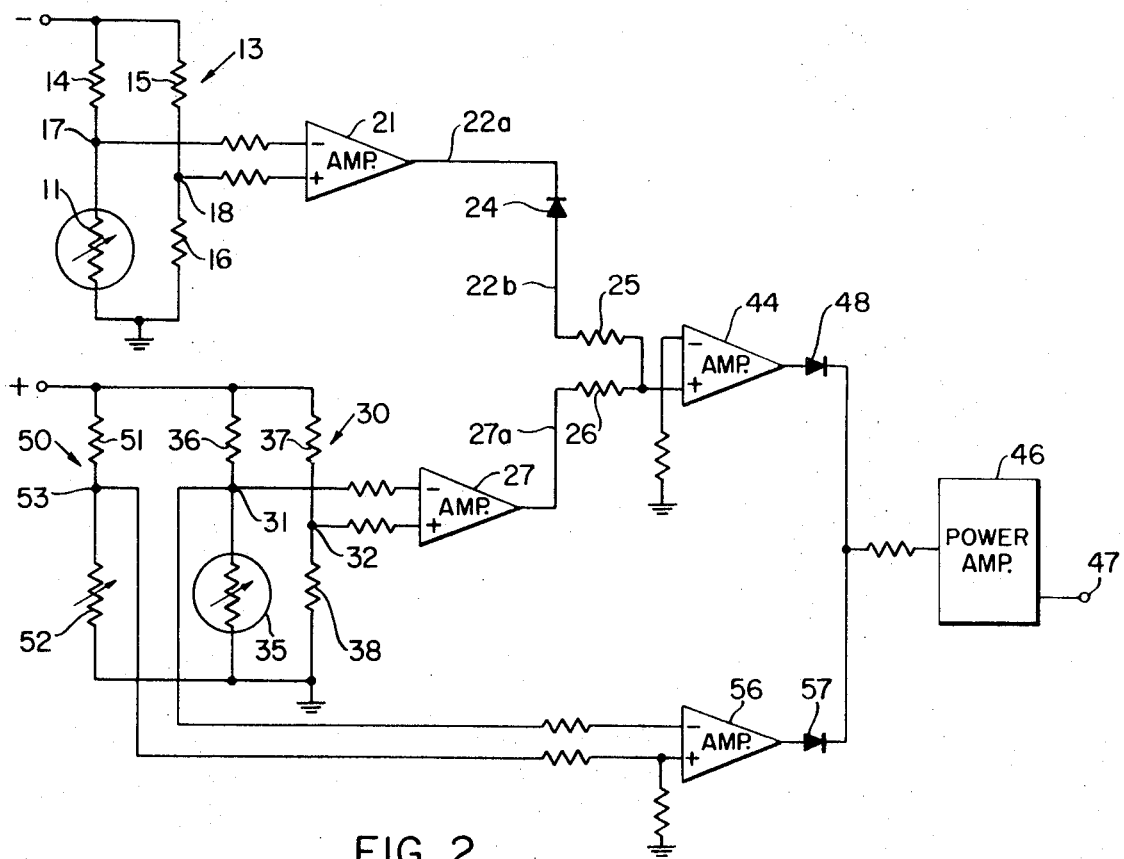
FIG. 2 is a schematic of the typical electronic dew point control circuit.

Referring to FIG. 2, a preferred embodiment of the control circuit is shown. A resistor 11 is enclosed within an enclosure 12 holding a suitable salt solution forming in a standard manner the wet bulb temperature sensing probe or thermometer. Resistor 11 is placed within a bridge circuit 13 as shown with resistors 14, 15 and 16, whose resistances are substantially fixed with respect to temperature and with the relative moisture content of the atmosphere. A negative bias is applied to the junction of resistors 14 and 15 while the junction of resistors 11 and 16 are grounded. The resistor 11 has the characteristics wherein its resistance increases as the temperature increases and as the vapor partial pressure of the air supply increases so that the voltage difference between a junction 17 (formed by resistors 11 and 14) and a junction 18 (formed by resistors 15 and 16) is proportional to the dew point or wet bulb temperature of the air. Referring to FIG. 3, since the bridge 13 is biased as shown, the resistance values of resistances 11, 14, 15 and 16 are chosen so that the potential difference between junctions 17 and 18 is 0 when the wet bulb temperature is about 4° F. below the freezing point at sea level or is 28° F. Then, as the wet bulb temperature drops, the potential of junction 17 falls below the potential of junction 18 and a wet bulb amplifier 21 amplifies the potential difference so that an analogue voltage is produced on output lead 22a as shown by curve 23 in FIG. 2. Curve 23 is preferably a straight line with a positive slope. In case the wet bulb temperature rises above 28° F. and junction 17 becomes positive with respect to junction 18, a positive voltage is placed on output lead 22a, and a diode 24 blocks the positive voltage, from being transmitted to series resistors 25 and 26. Resistor 26 is, in turn, connected to an output lead 27a of a dry bulb amplifier 27.

Amplifier 27 is similar to amplifier 21 and amplifies the potential difference between junctions 31 and 32 on a dry bulb bridge circuit 30. This bridge circuit 30 measures the dry bulb temperature of the air stream and includes resistors 35, 36, 37 and 38. Resistor 35 has the characteristics that its resistance value changes with temperature and is not affected by the moisture content. Resistors 36, 37 and 38 have the characteristics that their resistance values do not change appreciably with temperature or moisture content. The junction of resistors 36 and 37 is biased positive while the junction of resistors 35 and 37 is grounded. In addition, the values of resistors 35, 36, 37 and 38 are chosen so that the potential difference between junctions 31 and 32 is zero when the dry bulb temperature is at 34° F., 2°above freezing to ensure no ice is present. Then, as the dry bulb temperature drops, the potential of junction 32 would rise above the potential of junction 31 causing the amplifier 27 to output a positive voltage as shown by curve 41 in FIG. 3. In addition, the curve 41 (that represents the dry bulb temperature) is preferably a straight line with a negative slope that is equal in magnitude to the magnitude of the slope of curve 23.

The values of resistors 25 and 26 are equal and, therefore, whenever the dry bulb temperature is above the dew point by no more than 6°, the junction of resistors 25 and 26 is positive with respect to ground. Therefore, the output of amplifier 44 is positive. This positive potential is coupled by a diode 48 to a power amplifier 46 to place a proportional amplified signal on an output terminal 47. This signal on terminal 47 is fed to the regulator 67 (FIG. 1) to open valve 16 to raise the wet bulb temperature When the dew point is just 6° F. below the dry bulb temperature, the negative potential on lead 22a is equal numerically to the positive potential on lead 27a. Since resistors 25 and 26 have equal resistance values, the potential of junctions 25 and 26 is at ground potential. The output of amplifier 44 is at ground potential so that amplifier 46 places terminal 47 at ground potential, and no heat is added.

If the dew point is less than the dry bulb temperature by more than 6° F., the junction of resistors 25 and 26 falls below ground. The amplifier's negative potential is blocked by diode 48 so that terminal 47 is still at ground potential.

Whenever the dry bulb temperature of the moving air stream is above 34° F., the potential on output 27a of amplifier 27 is below ground or negative. Then the junction of resistors 25 and 26 is at a negative potential The negative potential on the output of amplifier 44 is blocked by diode 48 so that the potential of terminal 47 is also at ground, thereby obtaining maximum refrigeration from the system even though the set bulb temperature happens to be equal to the dry bulb temperature.

When an aircraft cabin is being air conditioned, means are required to prevent the cabin supply air temperature from falling below comfortable limits. In the present invention this feature is provided by another bridge circuit 50 which has the two resistors 35 and 36, common to bridge circuit 30 and additional series resistors 51 and 52 connected as shown forming a junction 53. Now the resistance of resistors 51 and 52 are fixed with respect to temperature and relative moisture content and the resistance of resistor 52 is set manually. The resistance value of the resistor 52 is set so that the potential difference between junctions 51 and 53 is zero when the temperature of the dry bulb temperature is at, for example, 25° F., which could be the minimum temperature, that the air stream should be to provide a comfortable temperature within the aircraft cabin. Since the resistance of resistor 35 falls as the temperature falls, the junction 31 falls below the potential of junction 53. Junctions 31 and 53 are coupled to the input of another amplifier 56 that places a positive potential with respect to ground on its output lead when junction 53 is at a higher potential than junction 31. This positive potential is coupled by diode 57 to amplifier 46 causing it to place a positive potential on terminal 47 and, in turn, adding heat to the air stream. When the temperature is above 25° F., the potential of junction 53 is below the potential of junction 31 causing amplifier 56 to output a negative potential. This negative potential is blocked by diode 57. One notes that a positive potential on the output of amplifier 44 would cause the amplifier 46 to place a positive potential on terminal 47.

Although only an exemplary embodiment of the invention is shown, various modifications and variations of the present invention are contemplated without departing from the spirit and scope of the invention. In view of the above teachings, these modifications and variations would be apparent to those skilled in the art. Therefore, the invention is not limited to the apparatus and procedures described, but includes all embodiments within the scope of the claims.

What I claim is:

1. An electronic device for preventing the formation of ice crystals in a cold air supply, said device comprising:
   first means for measuring the wet bulb temperature of the air supply and forming a first signal that is related to the wet bulb temperature,
   second means for measuring the dry bulb temperature of the air supply and forming a second signal that is related to the dry bulb temperature,
   third means for comparing said first and second signals and forming a third signal whenever the wet bulb temperature is substantially equal to or higher than the dry bulb temperature, and
   fourth means responsive to the presence of said third signal to add heat to the air supply so that the ice crystals do not form.

2. The device of claim 1 wherein:
   fifth means are included for detecting when the dry bulb temperature is above the freezing point of water and for preventing said third means from forming said third signal whenever the dry bulb temperature is above the freezing point of water.

3. The device of claim 1 wherein:
   means are provided for preventing the dry bulb temperature from falling below a predetermined minimum.

4. The device of claim 1 wherein:
   said first signal as produced by said first means is a first analogue voltage which is directly related to the wet bulb temperature,
   said second signal as produced by said second means is a second analogue voltage which is inversely related to the dry bulb temperature,
   said first voltage is at the 0 level when the wet bulb temperature is slightly below the freezing temperature of water while said second voltage is at the 0 level when the dry bulb temperature is substantially at the freezing temperature of water, and
   said third signal is a third voltage produced by adding said first and second voltages and said third means includes a diode for blocking the third voltage from said fourth means whenever said third voltage indicates that said wet bulb temperature is substantially below the dry bulb temperature.

5. A control system for an air conditioning unit comprising:
   a source of cold air;
   a source of warm air;
   first means for combining the cold and warm air;
   electronic means for sensing the wet bulb temperature and said dry bulb temperature of said combined air and producing a control voltage when the wet bulb temperature is approximately equal to said dry bulb temperature;
   a screen disposed within said first means so that the combined air flows through said screen;
   a valve disposed to control the flow of at least one of said sources of air;
   a fluid pressure regulator for producing a fluid pressure that is related to said control voltage coupled thereto;
   second means having a movable member that moves in response to said fluid pressure,
   third means for mechanically coupling said movable member to said valve so that the opening of said valve varies when said movable member moves; and
   fourth means coupling the air pressure produced on the upstream side of said screen to one side of said movable member and for coupling the air pressure produced on the downstream side of said screen to the other side of said movable member to cause said valve to warm the temperature of the combined air when a pressure differential appears across the screen.

6. The system of claim 5 wherein:
   fifth means are included for detecting when the dry bulb temperature is above the freezing point of water and for preventing said third means from forming said third signal whenever the dry bulb temperature is above the freezing point of water.

7. The system of claim 5 wherein:
   sixth means are provided for preventing the dry bulb temperature from falling below a predetermined minimum.

8. In the control system of claim 5 wherein said electronic means includes:
   first measuring means for measuring the wet bulb temperature of the air supply and forming voltage that is related to the wet bulb temperature,
   second measuring means for measuring the dry bulb temperature of the air supply and forming a second voltage that is related to the dry bulb temperature, and means for comparing said first and second signals and forming said control voltage whenever the wet bulb temperature is approximately equal to the dry bulb temperature.

9. The system of claim 8 wherein:

said first voltage is a first analogue voltage which is directly related to the wet bulb temperature, said second voltage is a second analogue voltage which is inversely related to the dry bulb temperature, said first voltage is at the 0 level when the wet bulb temperature is slightly below the freezing temperature of water while said second voltage is at the 0 level when the dry bulb temperature is substantially at the freezing temperature of water, said comparing voltage is produced by adding said first and second voltages and said third means includes a diode for blocking the third voltage from said fourth means whenever said third voltage is at a negative value.

10. A control system for an air conditioning unit comprising:

a first duct to supply a flow of cold air;

a second duct to supply a flow of warm air;

a third duct to receive and combine the flow of cold air from said first duct and the flow of warm air from said second duct;

means operably associated with said third duct to sense the wet bulb temperature and the dry bulb temperature of the combined cold air and warm air in said third duct and generating a signal when the wet bulb temperature is approximately equal to or higher than said dry bulb temperature;

valve means operably associated with said second duct to increase the flow of warm air to said third duct in response to the signal produced by said wet bulb and dry bulb temperature sensing means to prevent the formation of ice within said third duct.

11. The control system for an air conditioning unit of claim 10 wherein said wet bulb and dry bulb temperature sensing means includes means to prevent the generating of the signal whenever the dry bulb temperature is above the freezing point of water.

12. The control system for an air conditioning unit of claim 10 and in addition an icing screen disposed within said third duct and a differential pressure responsive means operably associated with said valve means and said icing screen to increase the flow of warm air should any ice form on said icing screen.

UNITED STATES PATENT OFFICE
CERTIFICATE OF CORRECTION

Patent No. 3,584,785    Dated June 15, 1971

Inventor(s) Dan S. Matulich

It is certified that error appears in the above-identified patent and that said Letters Patent are hereby corrected as shown below:

Claim 9, line 11, "comparing" should read -- third --.

Claim 9, line 12, delete "third" substitute --comparing--

Signed and sealed this 11th day of April 1972.

(SEAL)
Attest:

EDWARD M. FLETCHER, JR.
Attesting Officer

ROBERT GOTTSCHALK
Commissioner of Patents